INVENTOR
ALFRED KASPAUL
ATTORNEY

INVENTOR
ALFRED KASPAUL

July 10, 1962 A. KASPAUL 3,043,222
ELECTRIC DEVICES FOR IGNITING THE CHARGE OF A PROJECTILE, SAID
DEVICES BEING ESPECIALLY INTENDED FOR USE ON ANTI-AIRCRAFT
OR ANTI-ARMOUR PROJECTILES
Filed July 29, 1957 3 Sheets-Sheet 3
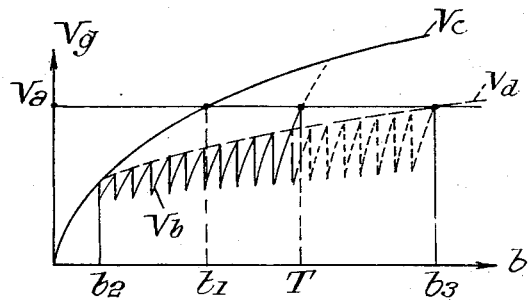
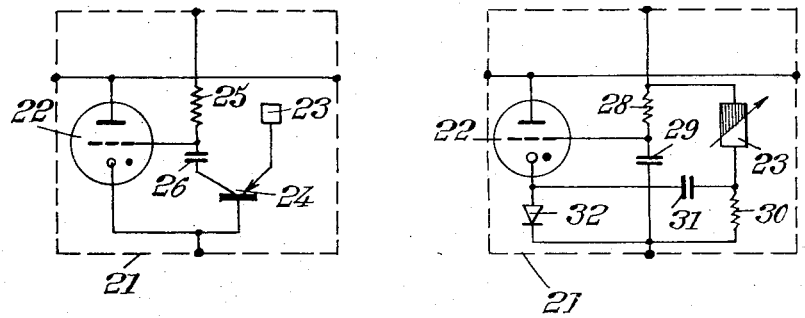
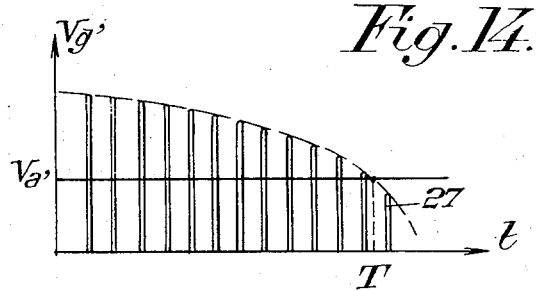
INVENTOR
ALFRED KASPAUL
BY
ATTORNEY

United States Patent Office 3,043,222
Patented July 10, 1962

3,043,222
ELECTRIC DEVICES FOR IGNITING THE CHARGE OF A PROJECTILE, SAID DEVICES BEING ESPECIALLY INTENDED FOR USE ON ANTI-AIRCRAFT OR ANTI-ARMOUR PROJECTILES
Alfred Kaspaul, Veyrier-Geneva, Switzerland, assignor to Brevets Aero-Mecaniques S.A., Geneva, Switzerland, a society of France
Filed July 29, 1957, Ser. No. 674,860
8 Claims. (Cl. 102—70.2)

The present invention relates to improvements in electric devices for igniting the charge of a projectile, said devices being especially intended for use on anti-aircraft or anti-armour projectiles.

The chief object of the present invention is to provide a device of this kind which meets the requirements of practice better than those used at the present time for the same purposes.

The device according to this invention includes means capable of initiating the charge, said means, considered separately, being arranged in such manner as to be capable of acting a certain time after the launching of the projectile, said time being adjustable preferably as a function of the reckoned distance of the target, and this device is characterized in that this time can be modified after the projectile has been launched by a correcting means sensitive, at least when the projectile is sufficiently close to the target, to the distance between said target and said projectile, this correcting means being arranged to modify the time of ignition of the charge in such manner that this ignition takes place automatically when said distance between the target and the projectile passes substantially through an optimum value for the result that is desired.

Preferred embodiments of this invention will be hereinafter described with reference to the appended drawings given merely by way of example and in which:

FIGS. 1 and 2 diagrammatically show two embodiments of devices made according to the invention.

Figure 1:
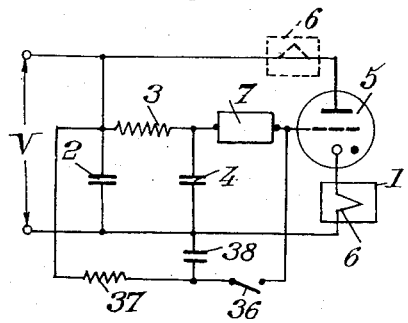
Figure 2:
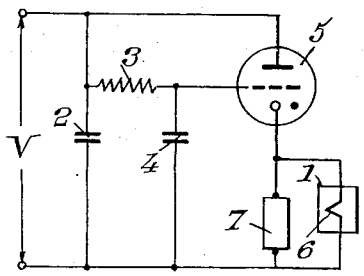
Figure 4:
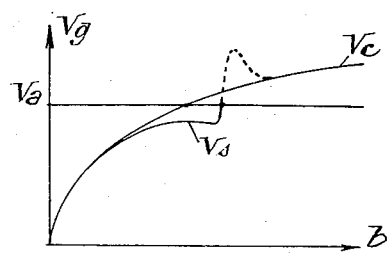
FIGS. 4 and 5 are diagrams illustrating the operation of two embodiments of correcting devices made according to the present invention.
Figure 5:
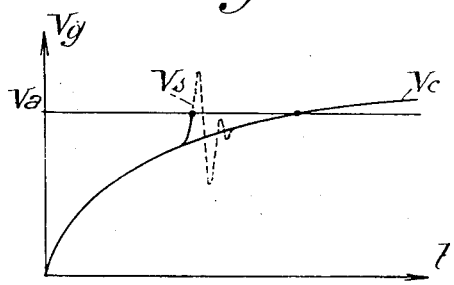
Figure 8:
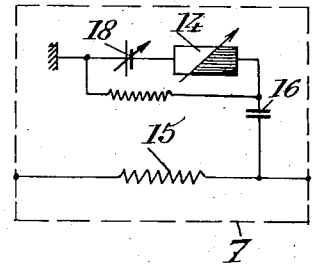
Figure 9:
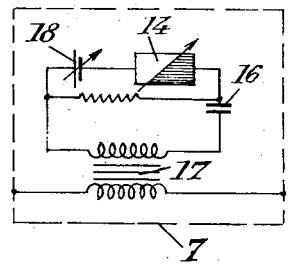

FIGS. 8 and 9 show the lay-outs of two modifications of the correcting device shown at 7 on FIGS. 1 and 2, said modifications corresponding to an operation of the device illustrated by the FIGS. 4 and 5 respectively.

Figure 10:
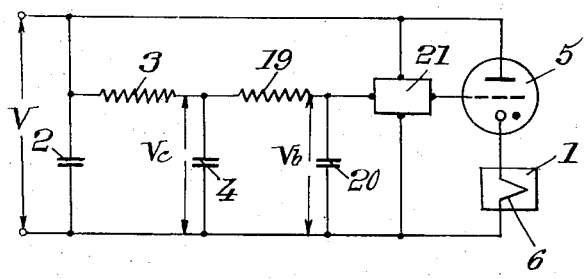

FIG. 10 diagrammatically shows the lay-out of still another embodiment of the present invention.

FIG. 11 is a diagram illustrating the operation of the embodiment of FIG. 10.

FIGS. 12 and 13 show the lay-outs of two modifications of the correcting device shown at 21 on FIG. 10.

FIG. 14 is a diagram illustrating the operation of devices diagrammatically illustrated on FIG. 12.

It is known that, when firing on a movable target, it is endeavoured to cause the trajectory of the projectile to pass through the future point of the target, account being taken on the time of travel of the projectile. When this theoretical condition is complied with, the projectile strikes the target.

It will be easily understood that this is but rarely the case, due in particular to the high velocities of the projectile, to the great distances between the projectile launching station and the target and to the difficulties inherent in the determination of the firing elements.

This is why, in particular, devices have been provided which act either as a function of the time elapsed after the launching of the projectile (such devices being hereinafter called "time setting devices"), or as a function of the distance between the target and the projectile (such devices being called "proximity devices"), all these devices being further sensitive to impact.

However, all the devices of this kind suggested up to now have several drawbacks among which the following may be cited:

Concerning the time setting devices, explosion takes place a given time after the launching of the target and this time, once set, cannot be modified despite possible modifications of the firing parameters, such as possible future modifications of the movement of the target and of the trajectory and velocity of the projectile;

Concerning proximity devices, they are sensitive to the proximity of any target over the whole length of the trajectory of the projectile so that it is not possible to select a target as a function of the reckoned distance of said target. Furthermore, such devices may be made inoperative, in particular by radiations emitted by the target.

The chief object of this invention is to obviate these drawbacks.

According to said invention, the device for igniting the charge carried by the projectile includes the following elements:

On the one hand, a time setting means capable, when used alone, of producing ignition a given time after the launching of the projectile, And on the other hand, means for correcting said time, said means being capable of acting, after the projectile has been launched, as a function of the distance between the target and the projectile, so as to modify the instant at which ignition is produced and to cause it automatically to take place when said distance passes substantially through an optimum value for the desired result, in particular through a minimum value as it will be hereinafter supposed.

Concerning first the adjustable time setting means, it is of the electric type and includes, as shown by the drawings, in a fuse body carried by the projectile, a main feed condenser 2 (FIGS. 1 and 2) (or a dry battery or a battery activated when the projectile is being launched) capable of gradually charging, through a resistance 3, an auxiliary condenser 4 of a capacity substantially lower than that of condenser 2. This auxiliary condenser 4 is inserted in the grid-cathode circuit of a gas discharge tube 5, the anode (or cathode) circuit of which is connected with an electric detonator 6 capable of exploding the charge 1.

The operation of such time setting means is as follows:

The main condenser 2 is charged at a voltage V at the time the projectile is launched (said voltage V being suitably adjustable). From this time on, the auxiliary condenser 4 is charged through resistance 3 so that the voltage $V_c$ between the plates of this auxiliary condenser increases according to the formula:

$$V_c = V\left(1 - e^{\frac{-t}{RC}}\right)$$

where R and C respectively designate the values of resistance 3 and the capacity of condenser 4. It should be noted that, in this formula, voltage V decreases slightly with time $t$ when it is supplied by a condenser such as 2, but that it remains constant when it is supplied by a battery.

Voltage $V_c$ being applied to the grid of the tube 5 and voltage V to the anode of this tube, it follows that, as long as voltage $V_c$ is lower than the firing voltage in the grid-cathode circuit $V_a$ (FIG. 3) of discharge tube 5, no current flows through detonator 6. But as soon as voltage $V_c$ reaches this value $V_a$, discharge takes place instantaneously in tube 5 and the detonator explodes, thus causing the projectile to burst.

Figure 3:
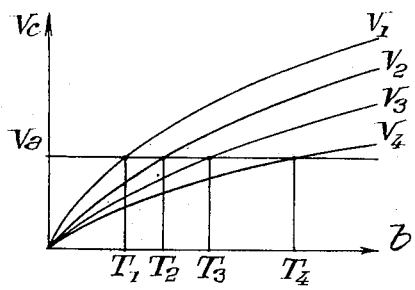
FIG. 3 is a diagram illustrating the electrical operation of a device of a conventional type as used in the present invention.

FIG. 3 shows the variations of voltage $V_c$ as a function of time $t$ for different values of the time setting voltage V applied, before launching of the projectile, across the terminals of condenser 2 (or of the battery which may be used instead of said condenser).

This figure shows that the time elapsing between the charging of condenser 2 (which as a rule is the time of launching of the projectile) and the firing of tube 5, which causes the projectile to burst, is adjustable by variation of the time setting voltage V within a range which depends upon the characteristics of tube 5. It is therefore possible to choose the value of voltage V before the projectile is launched as a function of the reckoned distance of the future position of the target so that the projectile explodes in the vicinity of said target. The higher the value of voltage V gives the shorter said time $t$.

As the correcting voltage has a limited value, it will be seen on the diagram that it can act only when voltage $V_c$ has reached a certain value and therefore when the projectile has already travelled a given distance.

As a rule, it will be supposed in what follows that the time setting is determined by a voltage obtained in the manner above stated and that the correcting means act upon this voltage.

Concerning said correcting means, it may be arranged in two different ways accordingly as it is mounted either wholly on the projectile, or partly on the projectile and partly outside of it, for instance at the launching station.

The first of these two solutions will first be considered.

The correcting means is sensitive to variations of a parameter which is a function of the distance between the target and the projectile. This parameter may be the intensity of a radiation transmitted either directly or indirectly from the target, said radiation consisting for instance of electro-magnetic waves, infra-red waves, light waves, acoustic waves or even rays emitted by a nuclear engine. The parameter may also be the capacity between the projectile and the target, or the inductivity of a winding capable of being influenced by variations of the distance from the target to the projectile.

The following description will deal successively with the case where the correcting means supplies a voltage applied directly on voltage $V_c$ (this case being designated as case A and being illustrated by FIGS. 1 to 9), and that where the correcting means acts upon a voltage different of $V_c$ (case B and FIGS. 10 to 14).

In both of these cases, the time after which ignition would take place if no correction existed must be given a value slightly too short or slightly too long as compared with that corresponding to the true distance from the launching station to the target.

According as this initial adjustment is too short ("short time setting") or too long ("long time setting") the correcting device will be different.

In case A, the correcting means will be arranged in such manner as to produce:

For short time setting, a negative voltage $V_s$ (FIG. 4) capable of being subtracted from voltage $V_c$ and of keeping the voltage $V_g$ applied on the grid of tube 5 below the firing value $V_a$ until the target is at the minimum distance from the projectile, at which time this negative voltage tends to become suddenly zero and therefore to cause value $V_g$ to pass above $V_a$;

For long time setting, a positive impulse $V_s$ (FIG. 5) capable of being suddenly added to voltage $V_c$ and thus to cause the voltage $V_g$ applied to the grid of tube 5 to exceed value $V_a$.

The correcting means used in case A is designated in a general manner by 7 on FIG. 1, where it is inserted between auxiliary condenser 4 and the grid of tube 5. Of course, this arrangement is indicated merely by way of example, for said means might also be disposed in the cathode circuit (FIG. 2), in which case detonator 6 must have a high ohmic resistance.

In a likewise manner, detonator 6 might be located in the anode circuit, as shown in dotted lines on FIG. 1.

The correcting means 7 may be constituted by, on the one hand, a receiver apparatus capable of detecting a radiation transmitted either directly or indirectly from the target, this apparatus having a directional characteristic, and, on the other hand, means for making use of the phenomenom created by this receiver apparatus and for causing it to act in the desired fashion upon the above mentioned voltage $V_c$.

Figure 6:
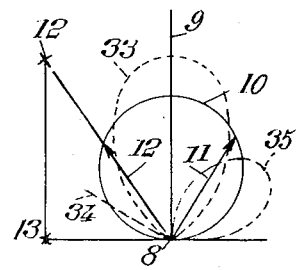
FIG. 6 shows the directional pattern of a radiation receiver used according to the present invention.

The directional pattern of the receiver may have the form illustrated by FIG. 6 where point 8 represents the position of the projectile, axis 9 its trajectory and curve 10 the geometrical locus of the end of a vector 11 representing the response of the receiver apparatus to the radiation transmitted from the target when said target is in the direction of this vector. When point 12 indicates the relative position of the target, the receiver apparatus detects a radiation corresponding to the length of vector 12. When, due to the fact of the relative displacement of the projectile and the target, these two bodies are located in a plane perpendicular to the trajectory 9 of the projectile (the objective being at point 13), the energy collected by the receiver becomes zero, so that the voltage U supplied by the receiver passes through a minimum or a maximum (the variations of this voltage as a function of time are shown by the solid line curves of FIG. 7).

When the radiation that is used is the electromagnetic radiation transmitted by a radar or other transmitter mounted on the projectile and reflected from the target, the abovementioned receiver may be essentially constituted by a radio antenna having a directional pattern. The receiver may also be a cell 14 (FIGS. 8 and 9) sensitive to an infrared, visible, or ultra-violet radiation either emitted directly by the target or reflected therefrom, this cell being disposed and arranged in such manner as to have the desired directional pattern. In a general manner, use may be made of any receiver capable of producing a voltage U in response to reception of a radiation.

The means for making use of this voltage are advantageously constituted by a known electronic apparatus (differentiating circuit; resistance 15—condenser 16) capable of supplying a voltage $V_s$ (in dotted lines on FIG. 7) proportional to the derivative of voltage U with respect to time.

This voltage $V_s$ is:

Either directly subtracted from voltage $V_c$, for instance according to the arrangement illustrated by FIG. 8, so as to act in the manner hereinbefore stated with reference to FIG. 4 (short time setting);

Or added to voltage $V_c$, for instance by means of an impulse transformer 17 (FIG. 9), so as to act in the manner explained hereinabove with reference to FIG. 5 (long time setting).

The feed source 18 of the receiver may be independent, but preferably it will be constituted by the main condenser 2.

Of course, according to the polarity chosen for this source 18, it is possible to utilize one or the other of the lay-outs illustrated by FIGS. 8 and 9 to obtain a correction based upon the principle of FIG. 4 or that of FIG. 5. However, advantageously, as it results from said figures, when the voltage $V_s$ is subtracted (case of FIG. 4) its variation must be slow whereas when said voltage $V_s$ is added (case of FIG. 5) its variation must be quick, which explains the choice above indicated.

In case B, there is disposed, between the grid of tube 5 and the whole of resistance 3 and condenser 4, a second system including a resistance 19 and a condenser 20 (FIG.

10) having a time constant much lower than that of the first system so that the charge of condenser 20, when the plates thereof are not short-circuited, tends to become equal within a very short time to that of condenser 4.

The correcting means 21 are then made to act upon the voltage $V_b$ across the terminals of this condenser 20 in the following manner.

It will be understood that if, by means of a switch, the two plates of condenser 20 are temporarily short-circuited this condenser will be discharged, and that, as soon as the short-circuit ceases, it will tend to be once more charged to a value close to that of condenser 4 at this time. If the switch is periodically actuated, the curve representing as a function of time the variations of voltage $V_b$ will be a saw-toothed curve as indicated on FIG. 11.

The correcting means is different according as the time setting is short or long.

In the first case (short time setting), ignition of the charge would take place, in the absence of correction, after a time $t_1$ (FIG. 11) which is too short. But if a target is located substantially in the direction where the projectile is travelling, the correcting means 21 starts producing the above mentioned periodical short circuiting as soon as the time of travel of the projectile has assumed a given value $t_2$ smaller than $t_1$, which gives the voltage applied to the grid of tube 5 an oscillating value as illustrated at $V_b$ on FIG. 11, and this voltage is allowed to become equal to $V_c$ (and thus to exceed the firing value $V_a$), due to the fact that this short circuiting ceases for a sufficient time, only after a time T greater than $t_1$ and corresponding to the minimum distance between the target and the projectile.

In the second case (long time setting), ignition of the charge would, in the absence of correction, take place after a time $t_3$ (FIG. 11) which is too long. For this purpose, for instance, the oscillations of the voltage $V_b$ across the terminals of the condenser 20 are produced automatically as soon as the charge of a suitable condenser (charged from condenser 2) is sufficient and ignition would take place, in the absence of correction, at the end of too long a time $t_3$ corresponding to the time where the peak of one of the saw-teeth representing $V_b$ exceeds value $V_a$. This is possible because curve $V_d$, which is the locus of these peaks, has an upward slope which, for a given device, depends only upon the initially chosen time setting voltage V. But the presence of a target in the vicinity of the projectile causes the correcting means to operate after a time T corresponding to the minimum distance between these two bodies, then stopping said periodical short circuiting of condenser 20 for a time sufficient to enable it to be charged beyond $V_a$.

It should be well understood that in the case mentioned in the preceding paragraph:

The time setting, which is too long, is still adjustable by acting upon the above mentioned time setting voltage V, and the practical effect of this adjustment is no longer directly to modify the value of $V_c$ (FIG. 11) and therefore that of a time such as $t_1$, but indirectly to modify the value of $V_d$ and therefore that of a time such as $t_3$;

The correcting means, as generally designated by 21, includes two portions: one capable of forming oscillations $V_b$ which replace voltage $V_c$ to act upon the grid of the thyratron whatever be the circumstances, said portion of the means being not truly a correcting element, and the other which is the correcting element proper in that it corrects the time setting while stopping said oscillations.

An embodiment will now be described for each of these two cases, to wit, too short a time setting and too long a time setting, case B:

The correcting means 21 is essentially constituted, in each of these two embodiments, by a second gas discharge tube 22 (FIGS. 12 and 13) to the grid of which is connected a circuit capable of producing a periodical and variable voltage, the variations of this voltage being controlled by a receiver apparatus 23.

In the first embodiment (FIG. 12, short time setting), receiver 23 is for instance a radar antenna having a directional pattern which feeds the transmitter of a transistor 24 the collector of which is connected with an oscillating circuit including a resistance 25 and a condenser 26 itself connected to the grid of tube 22.

Figure 7:
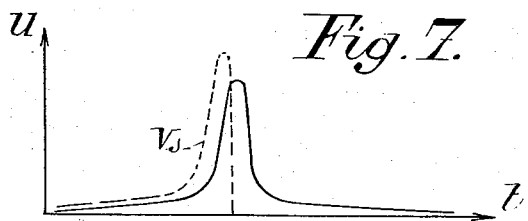
FIG. 7 is a diagram illustrating the variation of two voltages used in some embodiments of the present invention.

Its operation is as follows:

On the collector of the transistor 24 is collected a voltage of amplitude proportional to that of the Hertziam waves received by the receiver 23 (waves emitted, chiefly by reflection, by the objective), which voltage has the mode of the curve in full lines in FIGURE 7.

As soon as the reception of the electro-magnetic waves emitted, in particular by reflection, by the target reaches a predetermined value, the resistance between the collector and the base of the transistor is such that the impulse $V_g$ (FIG. 14) applied to the grid of the tube 22 by the whole oscillating system has a value higher than that of the firing voltage $V_a$, of this tube 22. This tube is therefore suddenly discharged and at the same time it partly discharges condenser 20 until said voltage $V_g$ becomes lower than the firing voltage of tube 22. From this time on, tube 22 is no longer a conductor and condenser 20 is again charged according to what has been stated with reference to FIG. 11.

The resistance of transistor 24 varies with the energy received by receiver 23. The various parameters are chosen in such manner that, when the target passes through a plane passing through the projectile and perpendicular to the trajectory thereof (which corresponds to no energy being received by the antenna), the resistance variation of transistor 24 acts in such manner on the conditions of oscillation of the circuit that the impulses $V_g$ applied to the grid of tube 22 (for instance 27), which impulses result from the differentiation of the oscillations of said circuit R (24 and 25)—C (26), have a value lower than $V_n$ and are insufficient for unblocking this tube 22: Condenser 20 is then charged in a very short time so that its charge is equal to that $V_c$ of condenser 4 at this time, which is above $V_a$: tube 5 then discharges and ignition takes place.

In the second embodiment (FIG. 13, long time setting), the charge of a condenser 29 in series with the resistance 28 is similar to that of the condenser 26 of FIGURE 12 and is automatically ensured from the condenser 2 even if there is no objective in the proximity of the projectile. The receiver apparatus 23 is in this case constituted by a cell sensitive to infra-red or other radiations emitted, either directly or indirectly, by the target; this cell is also fed from condenser 2 and is mounted as a voltage divider with a resistance 30 mounted in parallel (through a condenser 31) with a diode 32 connected with the cathode of tube 22.

When the distance from the target to the projectile passes through a minimum, the resistance of cell 23 passes through an extreme value and the differentiating circuit (30, 31) applies on the cathode of tube 22 an impulse of the kind of that shown in dotted lines on FIG. 7. This phenomenon increases the voltage applied on said cathode, which blocks tube 22 for a time sufficient to enable condenser 20 to be discharged beyond the firing value of tube 5 and therefore to produce the discharge thereof and the desired ignition of the charge.

It should be noted that the arrangements illustrating case A and, in particular, case B have the important advantage of permitting a very sensitive response of the control of the correcting means. Experience taught that the explosion of the projectile can easily be produced some milliseconds only after the distance between the target and the projectile has passed through its minimum value: in other words, for a relative velocity averaging 1000 meters per second between these two bodies, the explosion will be produced at only some meters from the point corresponding to their maximum proximity, which is well below the tolerance limits that are practically admissible.

Of course, a great number of modifications may be considered without departing from the scope of the invention. Thus, the whole of parts 23, 24 and 26 of FIG. 12 might be replaced by a variable condenser sensitive to the proximity of the target and for instance made of cadmium and selenium.

It should be noted that, in the systems described with reference to FIGS. 11 to 14, it suffices for the variable electric parameters sensitive to the radiation that is received to undergo small relative variations (at most of the order of a ratio of 2 to 1) to make the correcting means operative, which permits of utilizing them efficiently even when the radiation that is received is very weak.

It should be well understood that only the main electrical elements of the lay-outs according to the invention have been indicated above and they may include all amplifying and/or adjusting means as may be desirable.

The gas discharge tubes 5 and 22 are preferably cold cathode tubes, which avoids the necessity of making use of means for heating the cathode.

Instead of being tangent at 8 (FIG. 6) to the plane perpendicular to the trajectory at this point, the pattern 10 might have another form such as that shown at 33 in dotted lines on FIG. 6 and tangent to the cone generated by generatrix 34 about axis 9. In this case, the received radiation would become zero (thus controlling the correcting means) a little before the distance between the target and the projectile passes through its minimum, which may be desirable in some cases. This pattern 10 might also have the shape of a surface of revolution generated about axis 9 (FIG. 6) by a curve (as shown at 35) which is not symmetrical with respect to this axis 9. Or it might be directed toward the rear of the projectile.

Concerning the second of the above mentioned solutions, according to which the correcting means is mounted partly on the projectile and partly outside of it, it is possible to operate as follows:

Waves (radio waves, infra-red waves or others) are transmitted by a transmitter located close to the launching station (which is fixed or movable) and these waves are caught by a receiver apparatus placed on the projectile.

Said transmitter is coupled through cricuits of a known type with a radar apparatus in such manner that the transmission of said waves is interrupted at the time the echo of the radar impulse reflected from the projectile coincides with that of the radar impulse reflected by the target.

Means are provided such as above indicated (for either of cases A and B) so as to make use of the nonreception of signals on the projectile, in particular by utilizing the impulse generated by differentiation of a voltage produced as a function of the received radiation.

With this solution, the accuracy of the point of explosion corresponds to that of the radar that is used.

It may be noted that if the anetnna is given a directional pattern turned toward the point of launching of the projectile, the device can practically not be jammed by undesirable high frequency transmissions coming from the target.

It is also to be noted that the great simplicity of control of the charge ignition in this case (mere stopping of a transmission generated from the launching station) may be taken advantage of to produce the explosion of several projectiles fired simultaneously.

For all embodiments of the invention, the source of voltage that is chosen may be other than a condenser 2 charged at launching time and discharging in another condenser 4. But this last mentioned source is preferred because it has the advantage of requiring no special device to ensure protection against bursting of the projectile at a short distance from the launching station, since condenser 4, which feeds the grid of tube 5, cannot be charged before it has reached a distance greater than that required for safety.

Of course, the projectiles above described may be provided with devices ensuring bursting by direct percussion, for instance by suddenly applying through a switch 36 (FIG. 1) sensitive to impact, the voltage of a condenser (2, 4 or another) on the grid of tube 5. Such arrangement may be completed by a system including a resistance 37 and a condenser 38 capable of ensuring safety at a short distance from the launching station, which makes any closing of switch 36 inefficient as long as the projectile has not travelled a minimum distance.

It should be noted that in the devices sensitive to impact and made according to the invention, it is advantageous to provide correcting means working on the principle of a long time setting so as not to loose the possibilities resulting from an impact.

It may be indicated that the device according to the invention may be made in such manner that the safety distance from the launching point averages from 30 to 100 meters, that percussion may be capable of igniting the charge of the projectile as soon as it has travelled this distance and that the correction may act upon the time setting for distance above 200 or 300 meters, self destruction of the projectile being automatic after the time corresponding to the time setting if no target has come within vicinity of the projectile.

What I claim is:
1. A fuse device for igniting a pyrotechnic composition carried by a projectile, comprising, within the projectile: a source of voltage the value of which is adjustable on starting of the projectile, said source being constituted by a primary condenser; a resistance connected with one terminal of said condenser, a secondary condenser mounted in shunt with said resistance on said primary condenser so as to be progressively charged by said primary condenser during flight of said projectile; a detonator mounted for setting off said pyrotechnic composition, an electrical system operatively connected with said detonator for detonating it when the voltage applied thereto exceeds a predetermined value, said system including a gaseous discharge tube the grid of which is fed from said secondary condenser, a third condenser charged by said secondary condenser and connected with the grid of said tube, means for periodically short-circuiting said third condenser from a predetermined delay period following the launching of the projectile, and means sensitive to the proximity of the objective and projectile for acting on said short-circuiting means to interrupt said short-circuiting when the distance between the projectile and the objective passes through a minimum value.

2. A fuse device according to claim 1, wherein said short circuiting means comprise an electronic interrupter connected to the terminals of the third condenser and an electronic circuit providing a control voltage for said interrupter, said interrupter closing when the control voltage exceeds a first value and opening when the control voltage becomes less than a second value equal to or less than that of the first.

3. A fuse device according to claim 2, wherein the electronic interrupter is a gaseous discharge tube.

4. A fuse device according to claim 2, wherein the electronic circuit comprises a resistance and a condenser mounted in series across said source of voltage, the control voltage of the interrupter being shared between said resistance and condenser.

5. A fuse device according to claim 2, wherein the control means sensitive to the proximity of the objective and projectile comprise a receiver of waves setting up a voltage which increases as these two bodies are closer to each other.

6. A fuse device according to claim 5 wherein said control means comprise a transistor connected in series with a condenser between the transistor and the source of voltage, said transistor being excited by the voltage from the receiver so that conduction can only take place when this voltage is sufficient.

7. A fuse device according to claim 6 wherein said control means comprise a differential resistance and capacity circuit supplied by the voltage from the receiver connected so as to conduct under the conditions of excitation of the interrupter so that the latter may be blocked in the open position.

8. A fuse device according to claim 7 wherein the differential circuit is connected to the cathode of the tube.

References Cited in the file of this patent

UNITED STATES PATENTS

| | | |
|---|---|---|
| 2,287,926 | Zepler | June 30, 1942 |
| 2,404,553 | Wales | July 23, 1946 |
| 2,441,030 | Page | May 4, 1948 |
| 2,557,949 | Deloraine | June 26, 1951 |
| 2,769,975 | Rines | Nov. 6, 1956 |

FOREIGN PATENTS

| | | |
|---|---|---|
| 864,373 | France | Jan. 17, 1941 |
| 410,123 | Italy | Mar. 23, 1945 |
| 573,621 | Great Britain | Nov. 29, 1945 |